United States Patent
Franco

[11] 3,921,597
[45] Nov. 25, 1975

[54] ROTARY INTERNAL COMBUSTION ENGINE

[76] Inventor: Salvatore M. Franco, 323 E. 10th St., New York, N.Y. 10009

[22] Filed: Mar. 18, 1974

[21] Appl. No.: 451,853

[52] U.S. Cl. .................. 123/8.31; 123/8.27
[51] Int. Cl.² .......................... F02B 53/08
[58] Field of Search ........ 123/8.27, 8.29, 8.31, 8.33

[56] References Cited
UNITED STATES PATENTS
| | | | |
|---|---|---|---|
| 2,366,213 | 1/1945 | Pover | 123/8.31 |
| 3,797,464 | 3/1974 | Abbey | 123/8.27 |

FOREIGN PATENTS OR APPLICATIONS
| | | | |
|---|---|---|---|
| 658,011 | 1/1929 | France | 123/8.27 |

Primary Examiner—C. J. Husar
Assistant Examiner—O. T. Sessions

[57] ABSTRACT

In a preferred embodiment, there is provided a rotary internal combustion engine including an enclosing casing with a space defined therein and having a disk shape in the nature of a closed cylinder with a circumscribing circular wall in which are located a fuel inlet port and an exhaust port and an air one-way valve inlet port for avoiding negative pressure within the chamber space, and within the chamber space there being mounted on an axis extending between opposite cylinder flat ends concentrically of the circular wall a rotary element also cylindrical in shape fitted rotatably but sealably within the casing and the rotary element defining along its circularly extending outer wall in series a separate compression chamber recess and a separate combustion chamber recess with which terminal ends of casing-mounted spaced-apart reciprocatable spring-biased baffles function to cause the fuel to become compressed first in the compression chamber and then forced into the combustion chamber by way of a casing channel extending through the casing wall and to cause the ignited fuel to exert pressure against one of the baffles mounted in the casing and an opposite equal force against a combustion recess wall of the rotary element to result in rotary propulsion of the rotary element within the casing. Accordingly, there is provided a rotary engine of new design and improved efficiency in gaining maximum power from fuel.

4 Claims, 3 Drawing Figures

U.S. Patent    Nov. 25, 1975    3,921,597
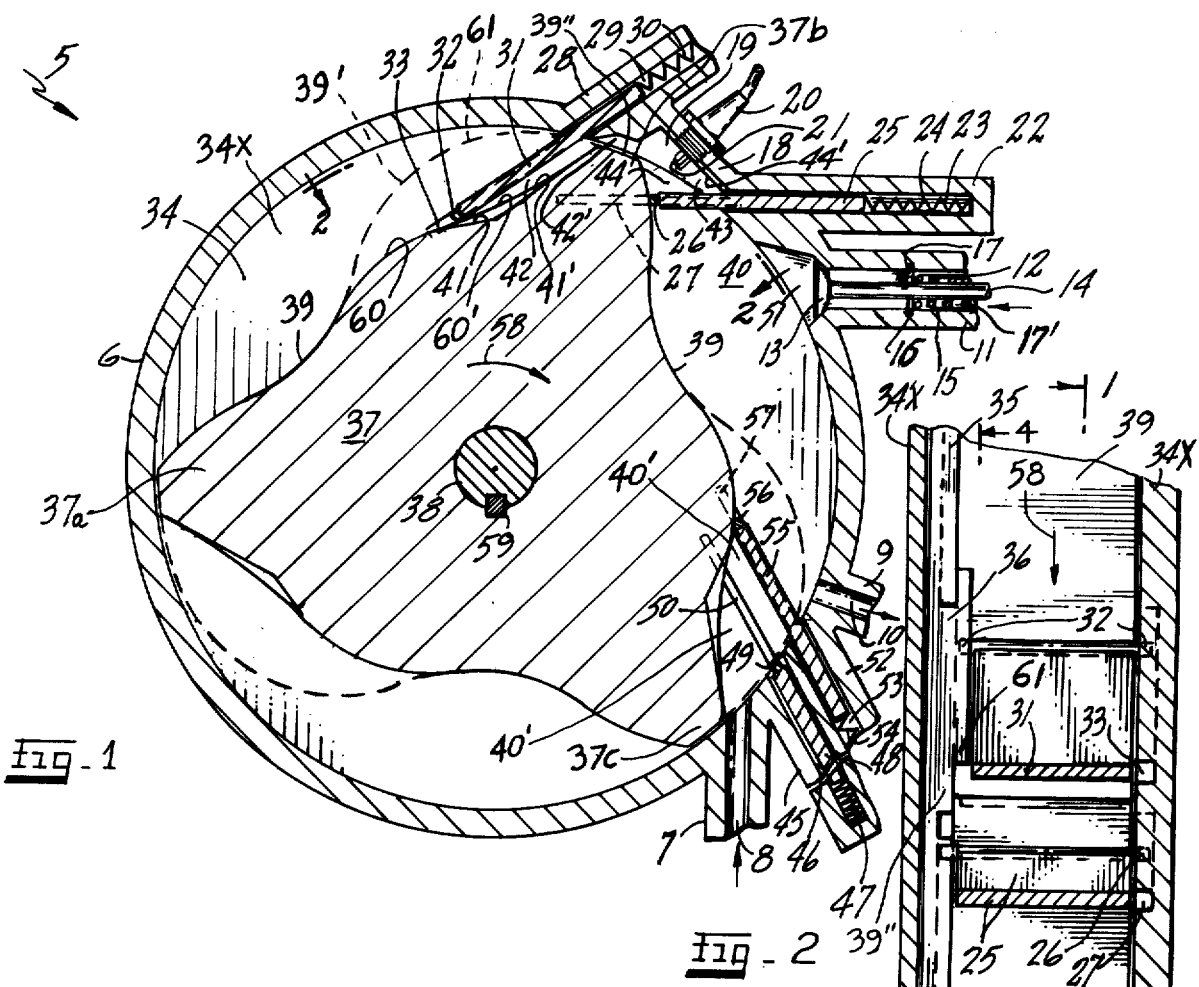
Fig. 1
Fig. 2
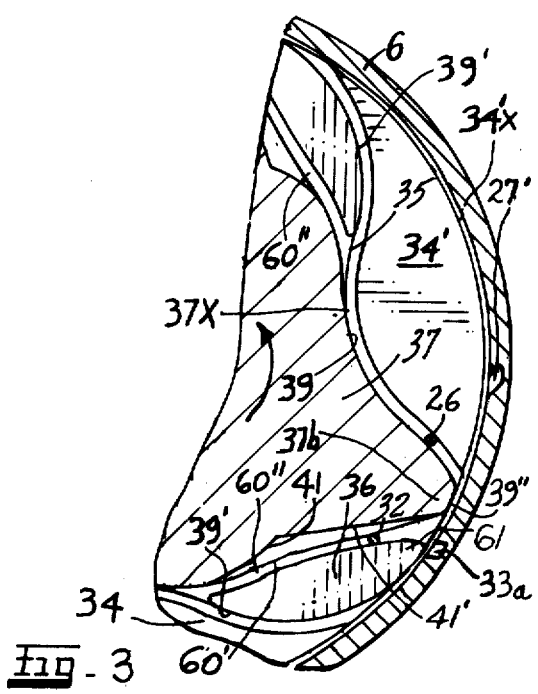
Fig. 3

ROTARY INTERNAL COMBUSTION ENGINE

This invention relates to a novel rotary combustion engine with novel advantages.

BACKGROUND TO THE INVENTION

Prior to the present invention there have existed many and varied designs of rotary combustion engines, but generally there have not been any notable breakthroughs previously in the nature of improved efficiency of power from the fuel nor in simplicity of construction thereof. It is common knowledge that the internal combustion engine is a highly inefficient device heretofore and that over the years a large amount of expense and effort have been expended by both government and private research and industry in efforts to make even minor improvements. Now, however, because of the energy crisis at hand for the foreseeable future, it is even more imperative that efficient use of existing natural resources such as petroleum fuels be maximized and/or enhanced, particularly with reference to the internal combustion engine.

There have existed some suggested rotary chambers with radially inwardly extending reciprocatable slide baffle members in the prior art, but such have no similarity in the functioning thereof as compared to the present invention.

Particular attention is directed to the feature of the pushing of a flat-faced piston in the non-rotary type piston engine in which the pushing of the piston results from forces in each of opposite directions against the piston cylinder wall end by the ignited expanding gases and concurrently against the piston face at the other end of the cylinder, to thereby drive the piston axially along the cylinder. Such opposite walls are not heretofore so clearly obtainable by the rotary engines for several reasons. In particular, the casing is located radially outwardly from the axis of rotation of the rotary element within the casing, with the result that for an ignition explosion at a chamber at the circular inner space of the circular chamber in which the rotary element rotates, the exploding and expanding gases of fuel tend to drive the rotary element in a direction toward the axis thereof rather than in any given rotary direction. That is to say that the force torque is radially inwardly. Prior patents and other efforts have been made to elongate in a radially-extending direction one chamber wall of a rotary piston element such as shown in each of U.S. Pat. Nos. 890,208 and 1,301,871 in order to gain a torque in a direction substantially normal (perpendicular) to a radius as extending radially outwardly, the normal directed force (if such could be achieved) serving to give a full leverage effect to the total torque rather than a tangential effect from a force directed primarily radially inwardly, in order to impart rotary motion to the rotary element, in theory; however, because there has to be a second returning wall eventually extending all of the way to the outer perimeter outwardly from the radially inward end of the normally extending wall, the expanding gas upon ignition also exerts its force on this surface, and as a matter of fact the more gradual in slope such wall is, the more surface area there is provided for the expanding gases to forcefully act upon. Accordingly, although the slope is less than the substantially radially extending perpendicular wall, the force on the large surface area of the gradually sloping wall is substantially the same or even greater than that on the normal wall. It is a scientific law that an expanding gas exerts an equal force in all directions and therefore is directing its force along the elongated surface of therefore large surface area as well as the small area of the normal wall at least partially neutralizing a part of the mechanical advantage and total torque that might otherwise have been attained from solely force against the normal wall of the combustion chamber. The scientific facts and theory discussed above are well known within the the field of hydrolic pressure as for example a piston lift where the increased surface on which the fluid is acting multiplies the mechanical advantage such that a small pressure from a piston pump may lift a large weight. Accordingly, the forceful acting of the gas on the large surface area of the other (opposite from the wall desired to receive the force) has a negative effect. Thus the overemphasized advantages emphasized by such patents substantially are insignificant. It is true, however, that where there are opposite parallel walls, one in the rotary combustion chamber and one in a casing wall both angled to obtain a near-normal direction of force, the channeling of the expanding hot gases along and between the parallel wall result in a gaseous momentum of gas mass to result in a greater force at the end wall of the rotatable chamber than on the rotatable chamber's sloping wall. However, such effect clearly does not overcome the negating effect of the sloping side chamber wall totally. A major portion of the torque is still not realized, accordingly, a major portion of the torque being substantially wasted as the hot gases cool or are exausted by the major force being in effect directed radially inwardly toward the axis which direction serves no purpose in driving the rotatable member rotatably.

SUMMARY OF THE INVENTION

Accordingly, objects of the present invention include the overcoming of one or more of the problems and difficulties and disadvantages of the type discussed above.

Another object is to provide a novel structured rotary internal combustion engine, including a novel fuel compression device.

Another object is to provide a rotary combustion engine of improved energy utilization of fuel upon ignition thereof.

Another object is to obtain an internal rotary combustion engine having an improved mechanism of compression and combustion of fluid fuel such as of a petroleum variety.

Another object is to obtain a rotary engine of improved simplicity of manufacture and/or operation and/or repair, together with reduced cost of manufacture and/or cost of operation and repair and/or maintenance.

Other objects become apparent from the preceding and following disclosure.

One or more objects are obtained by the invention as defined herein.

Broadly the invention includes a casing having a rotary member mounted therein with the rotary member having a combustion-chamber recess extending radially inwardly from the circularly rounded outer surface extending peripherally around the rotatable member, and having spaced from and in rotary alignment with the combustion-chamber recess a leading much larger compression-chamber recess or depression in the outer circumscribing wall of the rotary member, and there being provided in the casing wall an angularly radially-inwardly extending lineally reciprocatable baffle wall which reciprocates lengthwise as a result of the inner terminal distal end thereof following sealably the surface of the outer circumscribing wall of the rotary member as the rotary member rotates beneath the terminal distal end which is spring-biased radially inwardly, whereby when fluid fuel mixture as gasoline and air admixture has been fed into the compression chamber space prior to that recess reaching the terminal distal end, as the compression chamber wall moves past the terminal distal end the fuel admixture becomes compressed in front of the sealing baffle wall, as the fuel admixture reaches its maximum compression as the baffle wall's terminal distal end reaches the end of the compression chamber recess, the compressed fuel admixture is channeled through a groove in the casing inner wall extending circumscribingly for a distance sufficient for the compressed gas mixture to make its way to the space-apart combustion chamber at which time ignition takes place by a spark plug or other ignition means located or associated with the combustion chamber. Thus, the novel compression chamber obviates the need of a special fuel mixture compression apparatus, the rotating member serving to thereby bring about compression of the fuel mixture permitted to earlier flow into the compression recess's space. In a preferred embodiment of the invention, there is provided a second such baffle wall also spring biased inwardly but located adhead of the combustion chamber space at the time combustion such that the second baffle wall follows the combustion chamber recess radially inwardly extending wall sealably to serve as a casing-mounted back-up wall to the combustion chamber preventing the ignited expanding gases from striking or exerting pressure against the trailing wall of the combustion chamber recess whereby there is zero pressure against the trailing wall substantially to result in a substantially total utilization of the torque of the exploding expanding hot gases of combustion acting against the wall extending substantially radially outwardly, whereby the torque force solely acts in a direction normal to the radius to effect a full effect of the torque in rotary propulsion of the rotary member. To obtain this effect, preferably the combustion-chamber baffle reciprocatable spring-biased-inwardly wall is sealably ridable along the recess radially-inward wall and is pushed outwardly by the gradually sloping upwardly wall of the recess as the rotary member continues to rotate. The compression chamber baffle wall is wider and does not follow into the combustion chamber and thus does not block the gases of the combustion chamber after ignition, whereby the gases continue to expand and drive the rotary member rotatably until a preferred additional pair of similar baffle wall spring-biased member sweep the exhaust gases from the compression chamber and from the combustion chamber prior to the readmission of the fuel admixture for the next cycle. Behind the compression chamber baffle wall which compresses the fuel admixture there is located preferably an air or other gas one-way valve inlet such that negative pressure does not result by vacuum created as the fuel-admixture is compressed on the other side of the baffle wall, but also such that the one-way feature prevents the expanding ignited combustion gases from escaping therethrough.

In a further preferred embodiment, there are a plurality of the above-noted series of combustion and compression recesses and accordingly a multi-explosive series of ignitions and combustions per cycle of the rotary member.

Although not illustrated, the ignition means could alternatively be located in the wall of the rotary member, but preferably is mounted in the wall of the casing associated with the combustion chamber.

The invention may be better understood by making reference to the following Figures.

THE FIGURES

FIG. 1 illustrates a side in-part cross-sectional view, as taken along lines 1—1 of FIG. 2, a preferred embodiment of the present invention.

FIG. 2 illustrates a substantially elevation plan view and in-part cross-section, in an in-part view, of the embodiment of FIG. 1 as taken along lines 2—2 of FIG. 1.

FIG. 3 illustrates a side in-part cross-sectional view as taken along lines 4—4 of the FIG. 2 illustrated embodiment.

DETAILED DESCRIPTION

In greater detail, FIGS. 1, 2, and 3 illustrate a preferred embodiment rotary combustion engine 5 including the outer motor casing 6 having a fuel conduit 7 defining fuel admixture inlet passage 8, exhaust gas conduit 9 defining exhaust gas outlet passage 10, pressure-relief conduit 11 defining air one-way valve rod passage 12 having mounted therein one-way valve 13 on spring-biased key 17' being biased by spring 15 against insert key 16 in notch 17, for feeding air into space 51 and 40 behind the compressing baffle 25 in the event of vacuum-like negative pressure and also for later in the cycle in the event of a negative pressure after combustion before exhaustion of the combustion gases. Spark-plug casing-mounting structure 18 mounting the spark plug 20 in a defined aperture also defines the spark-plug portion of the combustion chamber 19 into which extends the sparking terminal 21, and also the structure 18 defining the recess passage 42' and 43 through which compressed fuel admixture makes its way into the rotary member's combustion chamber space portion 42 as the rotary member rotates its combustion chamber space 40' forwardly beneath the space 42'. Casing chamber structure 22 defines a baffle wall slide-space 23 in which a biasing spring 24 biases inwardly the slidable fuel-compressing baffle wall 25 having a sealing and rollable or slidable sealing element 26 reciprocatable within the casing inner side wall groove 27 and outer-casing wall 6 key-receiving recess 27' (of FIG. 4), the seal element riding along the surfaces 39", 39' and 39, compressing fuel admixture pressed against the forward face thereof originally filling space 40' which becomes space 34, then becomes space 40, then becomes finally compressed space portion 44 from which latter space 44 compressed gas fuel admixture of typically gasoline and air is permitted to escape from chamber 44 into passage 43, into space 19, into space 42, and as the rotary member turns in direction 58 eventually permitting the gas admixture to pass from chamber passage space 43 into space 42. The passage 43 wall 44' is recessed radially outwardly beginning preferably immediately adjacent the leading edge of the baffle wall 25 and its recess space 43 such that no compressed gas becomes trapped ahead of the baffle wall 25. The casing wall structure 28 defines a baffle wall slide-space 29 in which a biasing spring 30 biases inwardly (radially inwardly) the slidable fuel-compressing baffle wall 31 having a sealing and rollable or slidable sealing element 32 reciprocatable within the casing inner side wall grooves 33 and 33a (opposite from groove 33 and shown in FIG. 4), the seal element 32 rides along surfaces 39'', 41', 60', 39 consecutively and serially as the rotary element 37 continues to rotate forwardly in direction 58. The casing 6 further includes the baffle wall structure 45 defining slide space 46 in which biasing spring 47 biases inwardly (radially) the slidable exhaust gas excluding slidable baffle wall 48 with its terminal end seal 49 which like other seals includes a key and baffle wall portion riding in the wall groove 50, and similarly for the casing structure 52 defining the passage space 53 with spring 54 and wall baffle 55 and seal 56 and wall groove 57. It should be noted that the two wall baffles 48 and 55 are both needed to fully exclude the exhaust gases from the space 40' after combustion because of the wall baffle 55 being narrower to fit solely within the combustion space portion 42 to clear-out that space whereas the wall baffle 48 is of greater width for clearing-out the larger space 40 as the rotary member 37 rotates with axis 38 by locking key 59.

Thus, as seen in FIG. 2, as the rotary member 37 advances in direction 58, the key of the seal 32 becomes spring-biased under portion 61 within groove 60'' whereupon the seal 32 becomes sealed slidably (or rollably) against wall 41 at the base of the leading edge 61 of the groove structure 36 of the wall adjacent a space 34 enclosed by wall 34x of the casing, as the rotary member 37 revolves past FIGS. 1 and 2 groove 33, while seal 32 rides FIGS. 1 and 4 surfaces 41', 41, 60 and 60', while the wall baffle 55 rides the wider space with its seal 56 riding surface 39' and then 39.

The FIG. 3 illustrates the rotary member 37 side wall 34x having respective grooves 37x in which the keys of seals 26 and 49 respectively ride, and grooves 60'' in which the keys of the seals 32 and 56 respectively ride, these grooves serving to assure that the seals are properly guided and maintained in a tight sealing relationship against the surfaces on which they respectively ride during the compression and combustion phases of the cycles, thereby preventing the leakage of compressed fuel admixture under the seal 26 during compression and preventing the leakage of expanding hot gases of combustion under the seal 32 during and after ignition.

In operation, each chamber series of the three separate sections of the rotary member 37 of FIG. 1 operates independent of the others such that there are three serially consecutive combustion firings per one revolution cycle of the rotary member 37, the fuel admixture being admitted through the fuel inlet passage 8, then compressed by the wall baffle 25, and the back casing-end of the combustion chamber being defined by the back face of the wall baffle 31 in a manner such that the expanding exploded hot gases of combustion are prevented from exerting any force downwardly or laterally against the surface 39 of the chamber 34 ahead (in front of) the wall baffle (on the opposite side of the wall baffle 31 from the combustion chamber space 42) such that there is no significant negative pressure to off-set the main laterally driving force of the expanding hot gases against the combustion chamber rotor wall 41'.

It is within the scope and spirit of the present invention to make such modifications and/or substitution of equivalents as would be apparent to a person of ordinary skill in this field. For example, it is possible to utilize a compressor to pre-compress fuel or fuel-air mixture before its entry by inlet passages 8 and 8a. Also, with reference to the FIG. 2 embodiment, there may optionally be a double railing as spaced-apart railings as a part of the rotor 37 — i.e., one railing on each of opposite sides of the combustion chamber 42, such that slide 25 reciprocates between the two spaced-apart railings, while the seal 26 would ride along the top of both of the spaced-apart railings while the combustion chamber passes beneath; in such a double railing embodiment, the side 31 would not extend laterally to the casing side wall 34x and such embodiment would be devoid of groove 33.

In the FIG. 1 embodiment, after combustion takes place in inter-connected chambers 19 and 42, thereafter the rotor 37 is revolved in direction 58 such that chamber 42 becomes larger and larger because beneath the baffle 31 bearing 32 the surfaces 60 and 39 consecutively are advanced; simultaneously beneath baffle 25 bearing 26, the consecutive surfaces'', 61, and 39 have advanced. As wall surface 61 passes the baffle 25 and thereafter until surface 39 reaches the baffle 25 bearing 26, there will be a communicating path above surfaces 61 and 39 respectively, beside (i.e., around the narrow width of) baffle 31, providing an opportunity for the high-pressure combustion gases of chamber 42 to in-part force themselves (combustion gases) into the low-pressure fuel mixture of chamber 34; the result of the pouring of hot gases into chamber 39 is to preheat the fuel mixture of chamber 34, as well as to provide for a subsequent next-burn step (of the three burns per cycle) completion-of-burn of the unburnt portions of combusted gases which have become admixed with the fuel admixture. Thus, a higher percentage of all fuel is eventually burnt, as well as the preheating providing for improved burn during the ignition of the heated fuel eventually to be in chambers 19 and 42.

I claim:

1. An internal rotary combustion engine comprising in combination: a motor casing means defining a casing recess, and a space of circular shape in a transverse cross-section across the casing means; an axis structure means extending axially of the circular shape and concentric thereto within the casing means; chamber-defining rotary structure means mounted on the axis structure means for rotation in the plane of the circular shape, within the space and having rotation structure defining at least two separate chamber-forming recesses extending radially inwardly from a radially-outwardly-directed face such that for each recess a chamber space is defined between the rotation structure and the inner circular wall of the casing means as part of the circular space of the casing means, one of said chamber-spaces being a first compression chamber space and another of said chamber-spaces being a second combustion chamber spaced in juxtaposition to and spaced from and in following sequence to the first compression chamber space, positioned a first predetermined distance along the radially-outwardly-directed face, the motor casing means providing a conduit channel for fluid communication between the first compression chamber-space and the second combustion chamber-space, the first and second chamber-spaces having the recessed walls radially inwardly angularly-extending in an inclined plane from said radially-outwardly-directed face in a gradual slope at at-least an end of the first compression chamber closest to and preceeding the second combustion chamber-space, the motor casing means including spaced around the inner surface thereof a fuel inlet-port-defining structure and spaced therefrom an exhaust port; an ignition means mounted in at least one of the motor casing means and the rotary structure means for igniting fluid fuel within the second combustion chamber at a predetermined point of rotation of the rotation structure when rotated such that said combustion chamber has communicated with said casing recess; and baffle means for compressing fluid of said first compression chamber-space into said second combustion chamber-space and providing at least a substantially radially-inwardly reciprocatable first wall-baffle mounted in and extending from an inner wall of the casing means in a plane about parallel to the axis structure means and transversely to the circular shape, and the wall-baffle being rideable flushly at its distal terminal end sealably against and along said radially-outwardly-directed face at points removed from said recesses and sealably against said inwardly angularly-extending recessed walls of said compression chamber, the first wall-baffle being located in juxtaposition to and at a leading edge of said casing recess, said baffle means providing at least a substantially radially-inwardly-reciprocatable second wall-baffle mounted in and extending from the inner wall of the casing means in a plane about parallel to the axis structure means and transversely to the circular shape and rideable flushly at its distal terminal end sealably against and along said inwardly angularly-extending recessed walls of the combustion chamber-space, said combustion chamber recess and said wall-baffle being of a substantially common and same width and of a lesser width than said first wall-baffle, the second wall baffle being located in juxtaposition to and at a trailing edge of the casing recess.

2. An internal rotary combustion engine of claim 1, including an air inlet-port means for unidirectional flow positioned in juxtaposition to a trailing face of the second wall-baffle, for obviating negative pressure differential following the trailing face when the distal terminal end of the second wall-baffle is riding along a base surface of said first chamber space of said chamber-defining rotary structure means.

3. An internal rotary combustion engine of claim 1, in which for each of said first compression chamber space and said second combustion chamber space, the rotation structure defines an upright flange chamber-defining side wall extending in a plane about parallel with the plane of said circular shape, and the motor casing means defining an upright side wall serving as an opposite side wall of the second combustion chamber, the motor casing means upright side wall including groove-defining structure defining a groove therein substantially lineally along the path of travel of the first and second wall-baffles, with a separate groove for each of the first and second wall-baffles providing for grooved travel reciprocating motion therealong, and the rotation structure upright side wall including groove-defining structure defining for each of the first and second chamber spaces a groove in juxtaposition to and following the shape of the base of the respective recesses such that the distal terminal end of the second wall-baffle follows extendably thereof first into the first compression chamber-space and thereafter into the second combustion chamber-space along the radially recessed peripheral walls thereof and such that the second wall-baffle follows extendably thereof into the first compression chamber space, whereby fuel is compressible by the first wall-baffle within the first compression chamber-space sequentially then into the casing recess sequentially then into the combustion chamber-space as the first compression chamber-space and the second combustion chamber-space rotate past consecutively the fuel inlet-port-defining structure, the casing recess, and the second wall-baffle means, and whereby as the fuel has been compressed within the second combustion chamber-space against which hot expanding gases push when ignited with the result that the gases push against the opposite leading end wall of the combustion chamber-space's chamber-defining rotary structure means to rotate within the motor casing means.

4. An internal rotary combustion engine of claim 3, including spring biasing means for each of the first and second wall baffles spring biasing the respective wall-baffle radially inwardly of the circular space.

* * * * *